Figure 1:
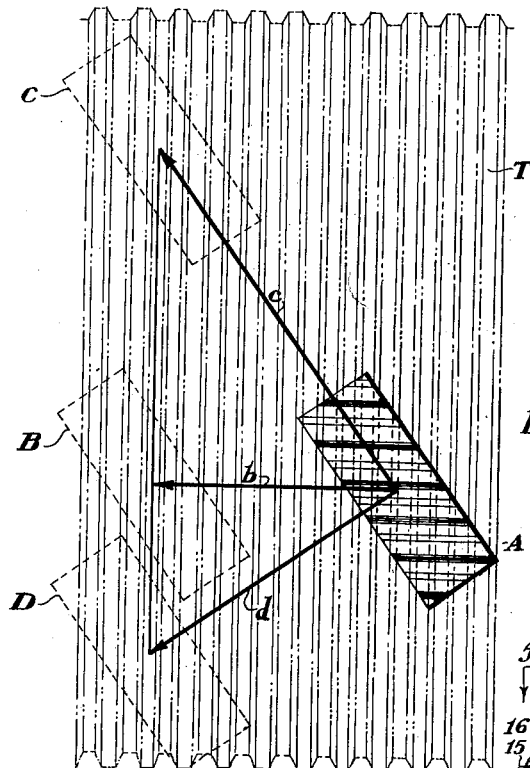

July 21, 1936.  C. H. SCHURR  2,048,520
GENERATING MECHANISM
Filed July 16, 1932   2 Sheets-Sheet 1

INVENTOR.
Charles H. Schurr
BY
Hawgood and Van Horn
ATTORNEYS

July 21, 1936.  C. H. SCHURR  2,048,520
GENERATING MECHANISM
Filed July 16, 1932  2 Sheets-Sheet 2

INVENTOR.
Charles H. Schurr
BY
Hawgood and Van Horn
ATTORNEYS

Patented July 21, 1936

2,048,520

UNITED STATES PATENT OFFICE 2,048,520

GENERATING MECHANISM

Charles H. Schurr, Cleveland, Ohio, assignor to The Lees-Bradner Company, Cleveland, Ohio, a corporation of Ohio Application July 16, 1932, Serial No. 622,964

9 Claims. (Cl. 51—95)

This invention relates to the generation of curved surfaces and is particularly applicable to the production of helical gear teeth of the involute system.

Heretofore, in producing spur gears having involute teeth parallel to their axes, a gear blank has been simultaneously rotated and translated to impart to the blank a motion identical with that which would be obtained if it were rolled on its base or a pitch cylinder, without slippage, upon a plane surface. The blank is thus rolled past a flat surfaced cutting tool such as a grinding wheel, and a tooth upon the blank, in traversing the grinding wheel, has developed upon it a true involute surface.

The position of the cutting surface to properly generate this curve must be in a plane coincident with the face of a tooth of an imaginary rack with which the finished gear will mesh. When the tooth face of this imaginary rack meshes with the gear at a given pressure angle the particular cylinder upon which the blank rolls is the pitch cylinder upon which it would roll in engagement with the rack. If the pressure angle be reduced to zero obviously the pitch cylinder becomes the base cylinder of the gear.

In the case of a spur gear, as above described, having its teeth parallel to its axis, the teeth of the rack are also parallel to the axis of the gear and the lines of contact between the rack teeth and gear teeth are likewise parallel thereto and extend from end to end of the teeth.

If, however, a helical gear be considered in mesh with the rack it will be obvious that the contact of any tooth of the gear with a tooth of the rack will no longer be parallel to the gear axis but will lie in the plane surface of the rack tooth and extend from root to crest of both the gear and rack teeth.

If the helical gear be considered as meshed with a rack of considerable extent in all directions it will be seen that it can be rolled upon the teeth of the rack without any slippage along these teeth in a direction normal to their edges and having rotated a given amount, it will have traversed a given number of teeth of the rack.

It will also be seen that the gear may be rolled in a direction normal to its axis through the same angular displacement and will have traversed the same number of rack teeth in the same manner, excepting that each of the gear teeth will have been slid slightly along a tooth of the rack.

Similarly the gear may be translated along its axis while rotating in mesh with the teeth of the rack and again the same angular displacement will cause it to traverse the same number of teeth of the rack, rolling upon each in turn and sliding somewhat along them.

The lines which generate the helical surfaces of the teeth are, in each case, all straight lines lying in the inclined surfaces of the rack teeth and corresponding to a line in the surface of each gear tooth inclining from root to crest thereof.

It has heretofore been proposed to include this generating line in the flat surface of a grinding disc or the like by causing this surface to coincide with the face of one of the teeth of the imaginary rack and by imparting to the gear to be ground any one of the three motions above described. These three types of generation are, respectively, illustrated in the patent to E. J. Lees, Patent Number 2,025,688, issued December 24, 1935, in my prior Patent No. 1,751,104 issued March 18, 1930, and in my copending application S. N. 559,722 filed August 27, 1931.

It is an object of the present invention to provide a generating surface other than a plane which will include the generating lines above referred to.

Another object is to provide an improved method of generating helical surfaces by which these surfaces may be rapidly and accurately produced.

Another object of my invention is to provide a non-plane generating surface such that two sides of a tool may be used simultaneously to generate accurate helical involute surfaces.

Other objects will hereinafter appear.

Figure 5:
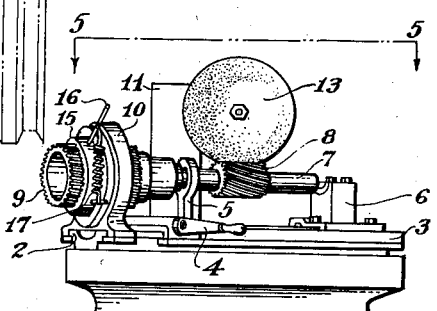
Figure 4:
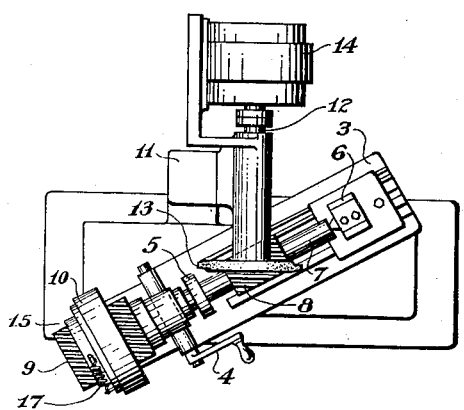
Figure 2:
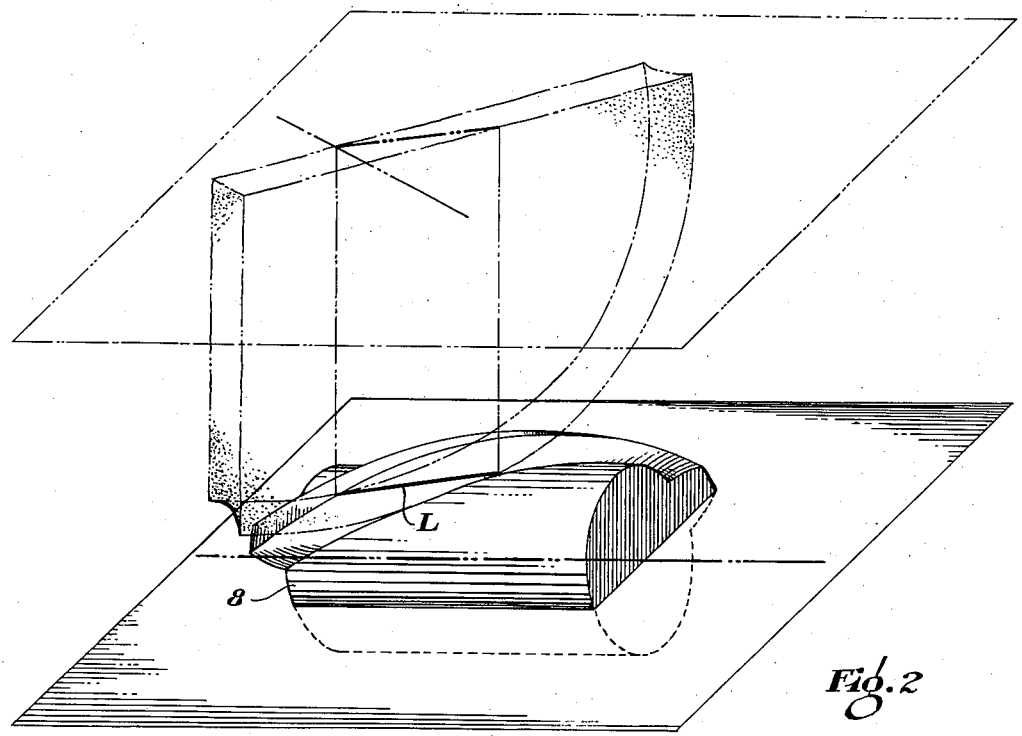
Figure 3:
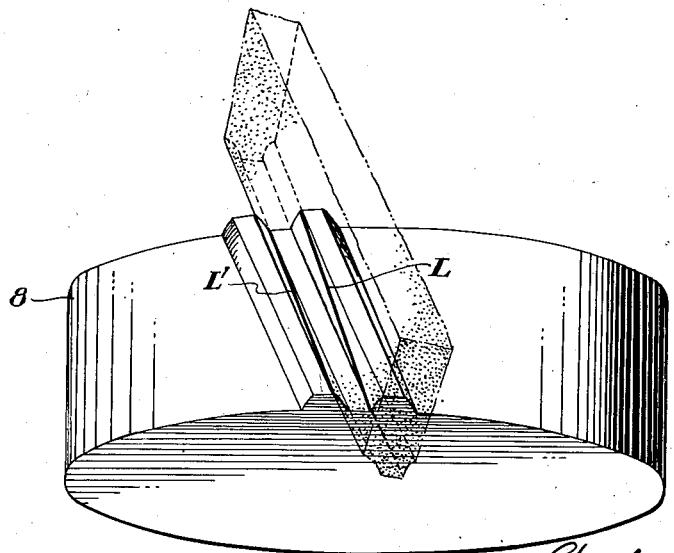

The invention will be better understood from the description of one practical embodiment thereof illustrated in the accompanying drawings in which;

Figure 1 is a diagrammatic view of a work gear and an imaginary rack with which the finished gear to be produced would mesh, Figure 2 is a fragmentary diagrammatic view in perspective of a portion of a gear and tool, Figure 3 is another fragmentary diagrammatic view in which is shown parts of both sides of a cutting tool of a type to be hereinafter described, Figure 4 is a plan view of a machine for practicing the present invention, and Figure 5 is a front elevation of the machine shown in Figure 4.

In Figure 1 a rack is shown having a series of teeth indicated by dot and dash lines. At A is indicated the position of a work gear at the beginning of a generating movement along the rack. As previously mentioned the gear A may roll along the teeth T of the rack without sliding thereon, the motion of the gear being in a direction normal to the edges of the rack teeth, its center following the arrow $b$, so that the gear assumes the position shown at B and in so rolling the flat faces of the teeth T will generate upon the gear teeth true involute helical surfaces. If a cutting tool having a plane cutting surface coinciding with one face of one of the rack teeth be provided, it will cut the tooth of the gear engaging it into the accurate involute helical profile desired. This is the motion made use of in the apparatus and method of Lees patent above referred to.

If the work gear is rolled from the position shown at A in a radial direction, it will travel along the arrow $c$ to the position shown at C in which it will have traversed the same number of teeth as in moving along $b$ but will have moved along the teeth in the direction of their edges by the distance between positions B and C. In passing over the flat tool surface, exactly the same curved surface will have been cut upon the tooth. This is the generating process which is carried on by the apparatus disclosed in my prior Patent 1,751,104.

If the work gear be moved along its axis it will follow the path indicated by the arrow $d$ to the position shown at D in which it will have again turned the same extent and traversed the same number of teeth as in moving along either arrow $b$ or $c$. In this instance the teeth will have slid along the teeth of the rack an amount equal to the distance between D and B, its motion being such as disclosed in my copending application S. N. 559,722 above mentioned.

In each of these three cases the components of the motion of the blank are identical, excepting the component in a line parallel to the edges of the rack teeth, so that in each case the identical tooth surface is developed.

The developing is done by an oblique line L lying in the surface of the rack teeth where this surface contacts the tooth of the gear and extending from root to crest of the gear tooth as most clearly indicated in Figure 2. The remainder of the rack tooth surface does not act upon the tooth of the gear when the parts are in the position shown in this figure but a number of lines parallel to that shown become successively the contact between these teeth.

It will therefore be seen that while the plane surface of the grinding wheel above referred to constitutes one locus of generating lines, another locus may be found by rotating such lines about the axis of the grinding wheel and that this locus, if the line and axis do not intersect or each lie in a plane normal to the other, will be a hyperboloid of revolution.

The manner in which the surface so generated contacts the teeth of the gear is illustrated in Figures 2 and 3, in which it will be seen that the contact is along the same straight line as was the contact with the rack tooth. As a hyperboloid of revolution may be produced by rotating any straight line about an axis not intersecting, parallel, or in a plane normal to it, it will be seen that the opposite side of the wheel may be formed to include the generating line L' which would lie in the opposite side of the rack tooth, so that proximate sides of two consecutive teeth may be simultaneously generated by a single pass of the grinding wheel.

This, of course, could not be done with a flat faced wheel corresponding to the inclined sides of the rack teeth, as the plane of one of the sides only could be included unless, of course, the rack tooth were one having no pressure angle and in the latter case dressing of the wheel would change the thickness thereof, spoiling the results obtained.

A wheel formed as shown in Figures 2 and 3 may be simply dressed by traversing a diamond or other dressing instrument along a straight line corresponding to the line of contact or may be similarly moved relative the wheel anywhere about the latter while it is in rotation.

Apparatus for using a wheel such as that above described is illustrated in Figures 4 and 5 in which 1 designates the base of a machine on the top of which are ways 2. Slidable upon these ways is a carriage 3 which may be reciprocated by means of a handle 4 having within the carriage, a pinion (not shown) meshing with a rack rigidly attached to the base. Carried by the carriage are bearings 5 and 6 supporting an arbor 7 to which is secured the work gear 8.

The outer end of the arbor is provided with a cylindrical portion or drum 9 having one or more helical grooves or lands formed on its exterior, and these are in turn threaded through complementary lands or grooves in a bearing 10 fixed upon the base so that as the carriage is reciprocated the spindle and work gear will be rotated. The lands have a lead which must be the same as that of the work gear but obviously the diameters may differ.

Carried by the base is an upwardly extending bracket 11 on which is journalled a shaft 12 carrying at one end a grinding wheel 13 and driven by a motor 14. The grinding wheel is shown as supported with its axis horizontal and is adjusted so that the lines of contact on its hyperboloidal surfaces will correspond with the lines of contact of the teeth of an imaginary rack meshing with the gear, and hence, when the slide is reciprocated, will generate true involute helical surfaces thereon.

A ring 15 is carried adjacent bearing 10 and is provided with internal grooves or lands complementary to those of the drum 9. When the carriage is moved to the extreme left from the position shown in Figure 6 the lands of part 9 have passed beyond bearing 10 and the operator may rotate the ring 15 by means of handle 16 by a distance equal to one or more teeth. When the carriage is returned to the right a fresh surface will be operated upon by the grinding wheel. A spring 17 connects handle 16 to bearing 10 and, while the drum is engaging both bearing and ring, holds the lands of drum 9 tightly against one side of the grooves of bearing 10, taking up any slack which may exist between these two and greatly enhancing the accuracy with which work is produced.

While I have described the tool above as a grinding wheel it will be obvious that a milling cutter, lap, or other type of tool might be substituted therefor and would, in the same manner, develop true involute helical curves upon the tooth faces.

While I have described the illustrated embodiment of my invention in some particularity obviously many others will readily occur to those skilled in the art to which this appertains, and I therefore do not limit myself to the precise details shown and described, but claim as my invention all embodiments, variations and modifications coming within the scope of the appended claims.

I claim:—

1. A tool having cutting edges lying in and to one side of the equator of a hyperboloid of revolution.

2. A tool having two series of cutting edges, each series lying in a hyperboloid of revolution to one side of the equator thereof, both series of cutting surfaces being disposed between the equators of the two hyperboloids.

3. A tool for generatively producing the faces of involute helical teeth which consists of a rotating member, the working portion of which lies in the hyperboloid of revolution which would be developed by the rotation of the line of contact of one of the gear tooth faces with an imaginary rack in mesh with the gear about the axis of the tool.

4. A rotating tool having cutting edges lying in the surface of a hyperboloid of revolution to one side of the equator thereof, the hyperboloid being that developed by rotating about the axis of the tool a straight line capable of serving as a generatrix of the surface to be cut.

5. The method of generating helical involute surfaces which comprises determining, in relation to a work holding spindle, one position of a straight line capable of developing upon a work piece the desired surface, positioning a rotatable tool having its working parts lying in a three dimensional curve which is the locus of a series of straight lines adjacent said spindle, adjusting said tool to cause said curve to include said first mentioned line, mounting a work piece on said spindle, and then rotating the spindle and tool and translating one of them relative the other.

6. The method of generating helical involute surfaces which comprises mounting a blank on which a surface is to be generated to rotate about its axis, mounting a tool to rotate about an axis oblique to and spaced from the first-mentioned axis, providing the tool with cutting edges which lie in the locus of a plurality of straight lines oblique to and spaced from both axes, rotating the tool and blank, and translating the tool and blank relative to each other.

7. The method of generating helical involute surfaces which comprises mounting a blank on which a surface is to be generated to rotate about its axis, mounting a grinding wheel to rotate about an axis oblique to and spaced from the first mentioned axis, providing the grinding wheel with a hyperboloidal surface which is the locus of straight lines capable of serving as elements of the helical involute surface to be generated, and lying to one side of the equator of said hyperboloidal surface, rotating the grinding wheel and blank, and translating the grinding wheel and blank relative to each other.

8. The method of generating helical involute surfaces which comprises mounting a blank to rotate about its axis, selecting a line capable of acting as a generatrix of the involute desired, producing a rotatable tool including the above mentioned line, the working surface of the tool being the locus of all lines similarly related to its axis, rotating the tool and blank, and relatively translating the tool and blank in such a manner that a line lying in the surface of the tool at all times corresponds in its position to that assumed by the generatrix in generating the involute surface.

9. The method of producing helical involute surfaces which comprises positioning a blank, selecting a line capable of acting as the generatrix of a desired surface on said blank, providing a tool with a three dimensionally curved surface of revolution which is the locus of a plurality of straight lines, bringing one of the lines in said surface into coincidence with said generatrix, and working the blank while maintaining a line in said surface in coincidence with said generatrix.

CHARLES H. SCHURR.